United States Patent [19]
Lange et al.

[11] 3,950,189
[45] Apr. 13, 1976

[54] METHOD FOR CUTTING OUT A WORK PIECE BY A PLASMA JET OR SIMILAR CUTTING ARRANGEMENT

[75] Inventors: Gerhardt Lange, Frankfurt am Main; Hans Hirschberg, Altenhain, both of Germany

[73] Assignee: Messer Griesheim GmbH, Frankfurt am Main, Germany

[22] Filed: Sept. 3, 1974

[21] Appl. No.: 502,763

[30] Foreign Application Priority Data
Sept. 18, 1973   Germany............... 2346847

[52] U.S. Cl.............. 148/9 R; 83/428; 83/516; 83/517; 266/23 B
[51] Int. Cl.²............... B23K 7/02; B26D 3/00
[58] Field of Search.......... 148/9; 266/23 B; 83/428, 83/516, 517

[56] References Cited
UNITED STATES PATENTS

| | | | |
|---|---|---|---|
| 2,026,754 | 1/1936 | Stafford | 83/428 |
| 3,272,042 | 9/1966 | Haas | 83/428 |
| 3,276,303 | 10/1966 | Tompos | 83/428 |
| 3,486,957 | 12/1969 | Fish et al. | 83/428 |
| 3,866,892 | 2/1975 | Hooper | 266/23 B |

*Primary Examiner*—W. Stallard
*Attorney, Agent, or Firm*—Ernest F. Marmorek

[57] ABSTRACT

A method for cutting out work pieces which have similar contours on both sides of an axis of symmetry thereof comprising the steps of scanning the contour of the work piece for developing control signals corresponding to the shape of the work piece, delivering the control signals for driving a plurality of cutting torches placed on a carrier, displacing the carrier in the direction of the axis of symmetry of the work piece representing the y direction of coordinates, and displaying the cutting devices transversely to the axis of symmetry of the work piece representing the x direction of coordinates, said cutting devices being displaced on equal distance along the x direction but opposite in sense, whereby a pattern having a mirror image on both sides of the axis of symmetry can be cut simultaneously by the cutting torches.

8 Claims, 2 Drawing Figures

METHOD FOR CUTTING OUT A WORK PIECE BY A PLASMA JET OR SIMILAR CUTTING ARRANGEMENT

FIELD OF THE INVENTION

The present inventon relates to a method for cutting out a work piece especially with the help of torch or plasma cutting apparatus and/or drawing the pattern of a work piece, in both instances on a metal plate, wherein the work piece is constructed with an outline which symmetrically lies on both sides of an axis of symmetry.

BACKGROUND OF THE INVENTION

It is known with the help of a torch or plasma burner having a cutting burner device thereon, to cut a work piece having any desired outline, from a metal plate. in which the burner is guided by hand or with the help of appropriate control devices (photoelectric scanning devices or numerical controls, etc.) over the metal plate and, in accordance with the outline of the work piece. The guiding mechanism generally used in such cases is a dual-axle machine which permits the cutting torch or burner to be moved in the x or y directions of this coordinate system.

Such dual-axle machines became known (for example from German laid open application (Auselegeschrift) DOS No. 2,207,873, especially FIG. 1 thereof), in which several cutting torches or burners are mechanically coupled with each other and all cutting torches are operatively moved by a signal of a control device in a uniform fashion. As a result it is possible to cut out simultaneously several similarly shaped work pieces, but each of the work pieces is cut out by a single torch.

In addition to the dual-axle machines there are the so called three-axle machines also known (such as from British Patent No. 917,376). In the last mentioned machines, a pair of cutting torches or burners are provided with a control arrangement so that is becomes possible that both cutting torches can be moved with the same speed in one coordinate direction ($y$-direction), while they can be moved with different speeds in the other coordinate direction ($-x$, $+x$). As a result, one may attain that simultaneously two different work piece outlines can be cut.

Notwithstanding the above-discussed state of the prior art known to applicants, on work pieces which have a similar outline on both sides of an axis of symmetry, that is, which both sides are mirror images of each other, so far exclusively only dual-axle machines have been in use for the cutting. One reason for this was that the dual-axle machines due to their simple controls are substantially less expensive than the three-axle machines.

With such dual-axle machines when a plurality of torches or burners are used to cut the work piece, a substantial increase in the productivity and thereby the economical use of the entire cutting machine could be attained since there is a constant pressure on the user of such machines to increase both of such factors.

An additional factor should also be considered, namely that when work pieces are cut out with torches, they must be free from buckling or warping due to heat in order to save time and costs in their subsequent processing period. Such heat warping usually is especially noticeable and takes place when the length of the work piece is substantially larger than the width of the work piece.

SUMMARY OF THE INVENTION

It is, therefore, an object of the present invention to provide a method of cutting out work pieces of the above type from a metal plate with the help of which the productivity of a dual-axle cutting machine is substantially increased and on the other hand which insures that the work pieces can be produced warp or buckle free due to heating.

According to the present invention, a single control arrangement is employed which delivers control signals according to a desired shape of the work piece to the drive of a carrier and to at least one of the several torches found on the carrier in a displaceable fashion and wherein the carrier is displaced in the direction of the axis of symmetry ($y$ direction) and the burner or torch is displaced transverse to the axis of symmetry and wherein the movements of the burners always equal but opposite in their direction ($-x$ compared to $+x$ directions).

As a result, according to the present invention a work piece which is symmetrically shaped is simultaneously being cut out with two cutting torches or burners. As a result the operating efficiency of the cutting machine (a dual-axle machine) is nearly doubled. Furthermore during cutting the burners engage a work piece at congruent points on the left and right side of the axis of symmetry of the work piece and will therefore deliver on both sides of the work piece, equal heat quantities into the work piece thereby practically eliminate warping due to the heating effect. With the application of the method according to the present invention work pieces having mirror image shape about their axis of symmetry are cut out. It is within the scope of the present invention that work pieces, having a similar form falling on both sides of an axis of symmetry, such as the mirror images of circles or rectangles, can be cut.

The invention is also employed advantageously in that pattern of a work piece or its outline can be drawn on a work piece on both sides of the axis of symmetry by employing a punch marker or a color spray pistol. All that is necessary is that on the burner carrier carrying the torches, a pattern drawing device, such as a punch marker or a color spray pistol, be provided. Such pattern drawing device can be moved into operating position by the control signals by being pivoted into position or by a device which is the subject of German Application No. 2236156.

According to the present invention the beginning of the cutting operation of both cutting torches can be had in different ways. For example, it is possible that both burner axles are tilted with respect to each other in such a fashion that the cutting jets (the oxygen or plasma jets) cut each other in a common point which lies in the region of a point of intersection of the outline of the work piece with the axle of symmetry of the work piece, and wherein the outline and the axis of symmetry are at a right angle. It is, however, necessary that after the performed cutting operation the burners must be again brought into their vertical position in order that a cutting of a work piece outline which lies parallel to the axis of symmetry could be cut with cutting edges which lie perpendicular with respect to the upper surface of the work piece.

It is especially advantageous when the cutting operation starts with a first contour line which can be cut at a right angle to the axis of symmetry during which with the first burner a cut is made which has similar lengths with respect to both sides of the axis of symmetry and the total length of which corresponds to at least the distance between the center axes of the two burners in their vertical position when they are moved toward each other on the carrier wagon. With such cut one will attain that both cutting torches without necessity to be tilted may start simultaneously with the cut. It is also within the scope of the present invention that the second torch or burner becomes coupled with the first burner or torch by means of a device causing the reversing of the transverse movement of the first burner and that the distance between the center axes of the two burners corresponds to the total length of the cut. Subsequently the first burner or torch through signals of the control arrangement and the second burner or torch through the return mechanism are moved in a mirror-image fashion until they reach the region of a second contour line cutting the axis of symmetry at a rectangle.

Under the scope of the present invention a reversing device is preferred, which for example, in a dual-axle machine employs an endless steel belt driven by appropriate control signals from the general control arrangement and in which the first torch or burner is clamped to one side of the belt and after the completion of the starting cut the second burner becomes clamped to the other side of the belt to thereby attain movement of the burners directed opposite but along the same axis. As a result a very simple reversing arrangement is obtained without making changes in the structure of the cutting apparatus itself. It is within the scope of the invention to cover also other reversing arrangements, such as, mechanical, electrical type of arrangements or which employ magnetic devices.

Furthermore, in order to retain an exact distance between the center axes of the burners, it is preferred that the second burner before the clamping will engage a boss provided on the first burner or torch and which boss corresponds to a certain dimension provided by the control arrangement.

After a substantial part of the outline of the work piece has been cut out both burners or torches come to a second contour line of the work piece which cuts the axis of symmetry at a rectangle. The burners according to the present invention are moved along such contour lines toward each other. Inasmuch as the burners, due to their structural size, cannot be dimensioned so that the center axes of them, that is, of both burners, could align with each other, and in order to avoid the above-noted tilting of the burners, the invention proposes that shortly before the burners engage each other the coupling between the two burners becomes released and the remaining portion of the outline will be cut through only by one of the burners.

BRIEF DESCRIPTION OF THE DRAWINGS

The present invention will become more readily apparent from the following description of a preferred embodiment and the manner of practicing the method thereof shown and described in the specification with respect to the drawings, in which.

DESCRIPTION OF THE PREFERRED EMBODIMENT

Figure 1:
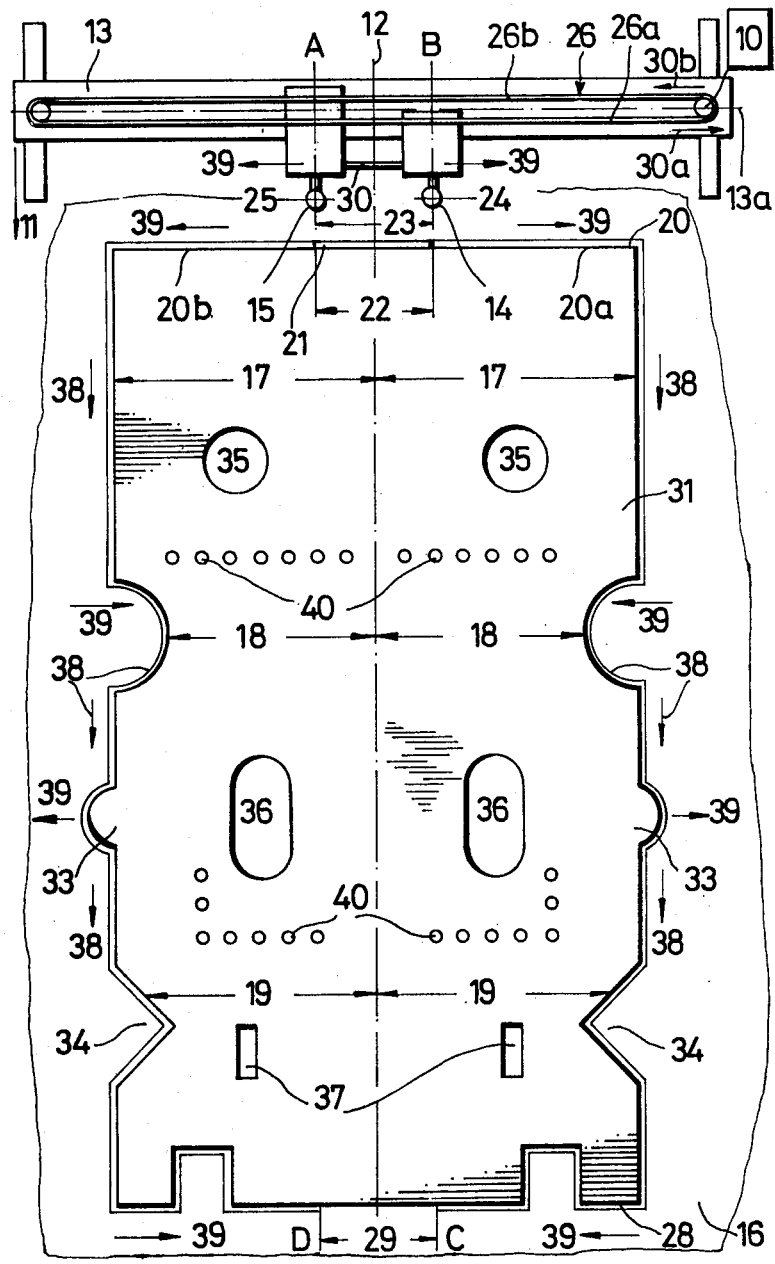
FIG. 1 is a schematic illustration of a dual axis torch cutting machine showing also the work piece to be cut out.

With reference to FIG. 1, it is noted that the two-axle torch cutting apparatus includes substantially a control arrangement 10 (which can be of the photoelectric scanning type, or numerical controls or similar control arrangement such as employed in U.S. Pat. No. 3,502,881), which delivers control signals corresponding to the work piece shape under cutting. The control signals can be readily stored in a numerical device or obtained by scanning a drawing of the work piece pattern. By means of such control signals a carrier carriage 13 is moved in the direction of the arrow 11 (representing the y direction in a rectangular coordinate system and a steel belt 26 will move in the direction of the double arrow 30a, 30b representing the plus x and minus x directions limit. On the steel belt 26 there are a pair of cutting torches 14 and 15 mounted which can be of the autogenous plasma-type, laser or cutting knife type, and can be also a pair of marking devices such as punch markers or paint spray pistols, mounted if needed for some type of work.

As illustrated in FIG. 1 a work piece 31 is being cut out from a plate 16. The work piece 31 is illustrated as having a similar contour or outline on both sides of the axis of symmetry thereof and will have circular cut out portions 32, 33, triangular cut outs 34 and holes 35, 36 rectangular cutouts 37, to be made thereon. The punching marks to be produced are indicated at 40. According to the present invention the burners 14, 15 are simultaneously moved over the plate 16 in the direction of the arrow 11 and being displaced during such movement transversely with respect to the axis of symmetry 12 so that both burners 14 and 15 are displaced by the same distance 17–19 from the axis of symmetry 12. During such movement the movement of the carrier 13 is directed toward the axis of symmetry 12, that is, the longitudinal axis 13a of the carrier 13 is at a rectangle with respect to the axis of symmetry 12.

The method of practicing the present invention in cutting out the work piece 31, for illustrative purposes, is as follows:

The burner 14 at the beginning is clamped or secured to the front part 26a of the steel belt in such a manner that its center axis 24 is aligned with the line A. The burner 15 is not coupled with the steel belt 26. The cutting operation is started on a first contour line 20 which is at a rectangle with respect to the axis of symmetry 12, and during which the first burner 14 by means of control signals is moved from line A to line B to that on both sides 20a, 20b of the axis of symmetry 12, and a cutting 21 having the same length on each side is produced. The length 22 of the cutting 21 corresponds to at least the distance 23 between the center axes 24, 25 of both burners 14, 15 when such burners are displaced adjacent to each other on the carrier 13. At point B the burner 14 becomes stopped, by for example, control pulses from the arrangement 10, and then manually, preferably however under the control of control pulses from the control arrangement 10, the burner 15 is moved toward burner 14 until both burners 14 and 15 will have a distance therebetween defined by the boss 30. The center axis 25 of the burner 15 now falls on the line A and the center axis 24 of the burner 14 falls on the line B. Now the burner 15 is coupled with the back belt portion 26b by being clamped thereto. By means of control signals from the control arrangement 10 now the drive of the steel belt 10 carrying the burners 14 and 15 and also the drive for the carrier 13 will be moved according to the shape of the work piece, following the arrows 38, 39 during which the burner 14 and the burner 15 will describe movements in the x direction, that is, in the direction of the arrow 39a, which have similar lengths, and which movements or paths are however directed opposite to each other. With the two burners 14 and 15 now simultaneously the outline of the work piece up to the points C and D has been cut out. At these points C and D the burners 14 and 15 are stopped by appropriate control signals from unit 10 and separated with respect to each other by releasing the clamping of burner 14 or burner 15 from the steel belt 26. The remaining portion 29 which is to be cut is finished by either burner 14 or 15 which is controlled by control signals from the unit 10 in performing that remaining straight cut.

Figure 2:
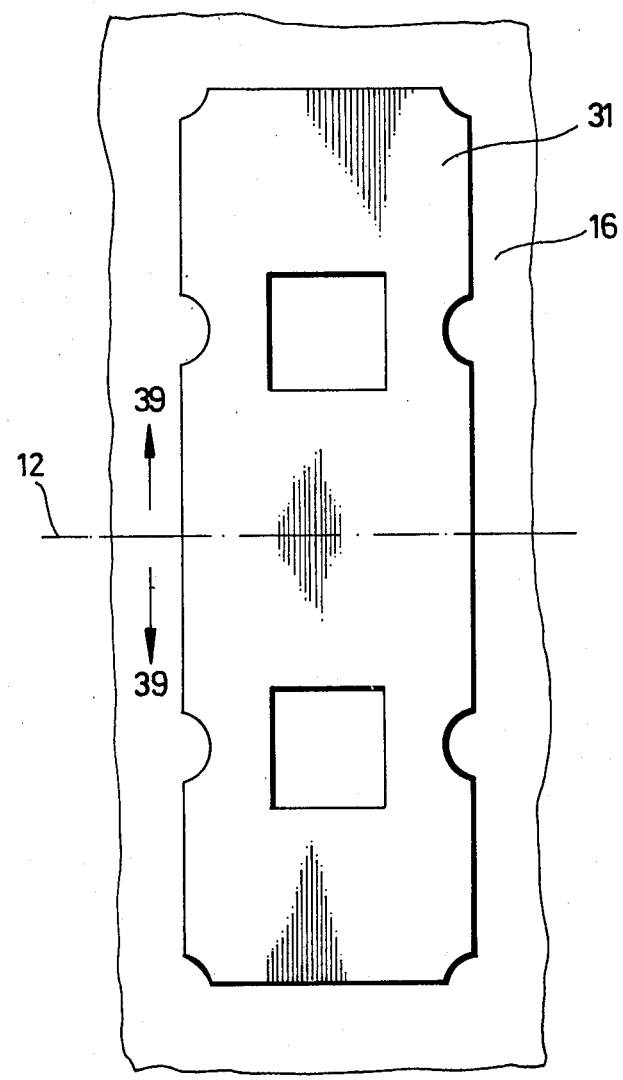
FIG. 2 is another work piece having a different shape.

In the above-described example for the method of operation according to the present invention, a work piece has been cut the length of which in the y direction is much longer than its width in the x direction. It is within the scope of the present invention to cut work pieces which are symmetrical, but shaped differently, for example, a work piece as shown in FIG. 2. It is also within the scope of the present invention to cut at the same time several similarly shaped symmetrical work pieces even with burners which are pair-wise attached to the steel band 26 and controlled by a single unit 10 and during which each burner pair like the one described and identified as 14 and 15, simultaneously will operate on the cutting of a single work piece of the plurality of work pieces cut.

The invention is not limited to the cutting of metallic work pieces since in its broad concept it is applicable to the cutting of work pieces other than metallic. The invention is especially applicable to dual-axis automatic cutting machines for soft materials, such as textiles, and also for the drawing of symmetrical structural elements using numerically controlled drawing machines.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A method for cutting out from a piece of predetermined material, a work piece imparting thereto a shape symmetrical about an axis of symmetry, using cutting devices operable to cut the material,
   comprising the steps of:
   a. mounting the material for axial movement relative to the cutting devices in a direction of the axis of symmetry;
   b. mounting two said cutting devices for normally simultaneous perpendicular movements of equal magnitude, relative to, and perpendicular to said axis of symmetry and in directions toward and respectively away from each other;
   c. activating said axial and perpendicular movements at the same time or, respectively, separately, as required by the desired shape of the work piece, whereby the sides of the work piece on each side of said axis of symmetry, are simultaneously cut with edges parallel and/or angular relative to said axis of symmetry.

2. The method as claimed in claim 1, wherein control signals operating said activating, said cutting by said cutting devices commences on a first edge perpendicular to said axis, said cutting devices comprising a pair of cutting devices normally sapced apart for a minimum distance, disengaging at least one cutting device from said normal mounting and thereafter displacing the other cutting device by said control signals to cut an initial line equal in length on both sides of said axis, the total length of said line corresponding to said minimum distance between said pair of cutting devices.

3. The method as claimed in claim 2, wherein after completing said initial line cutting with said first cutting device, said second cutting device is coupled with said first cutting device by means of a coupling means causing a reversing of the cutting direction of said first cutting device until the distance between the center axes of said cutting devices will correspond to the total length of said first edge.

4. The method as claimed in claim 3, after coupling said two cutting devices to said reversing arrangement, said first cutting device and said second cutting device are moved by means of said reversing arrangement in a mirror image fashion with respect to each other until they reach the region of a second edge, whereby during cutting lines running parallel to the axis of symmetry, said cutting devices remain stationary and said carrier is driven along the axial direction and during cutting pattern lines running other than parallel or perpendicular to the axis of symmetry, the carrier and the cutting devices are simultaneously displaced to follow said outline.

5. The method as claimed in claim 4, wherein when the cutting devices reach a region of said second edge intersecting the axis of symmetry said coupling between said cutting devices is released and the remaining line is cut by one of said cutting devices.

6. The method as claimed in claim 5, wherein said cutting devices are a pair of autogenous plasma jets, laser cutting devices or cutting knives, and wherein said reversing arrangement is an endless belt, said first cutting device being clamped to one side of said endless belt and said control arrangement delivering said control signals to the drive of said endless belt and to said drive of said carrier means, and after completion of the initial cut by said first cutting device said second cutting device is clamped to the other side of said endless belt.

7. The method as claimed in claim 6, wherein said second cutting device before being clamped to said endless belt is run into a spacing boss provided on said first cutting device, said boss in its length corresponding to a scale defined by said control arrangement.

8. An apparatus for cutting out work pieces from a piece of predetermined material, imparting thereto a shape symmetrical about an axis of symmetry, comprising
   two cutting devices operable to cut the material;
   a cutting devices carrying member for holding said cutting devices;
   a work piece carrying member for holding said material during cutting;
   drive means for moving one member relative to the other in a direction of the axis of symmetry;
   actuating means for normally moving the two cutters relative to each other perpendicularly of the axis of symmetry, simultaneously for symmetrical distances from the axis of symmetry, toward and respectively away from each other; and
control means for activating said driving means and said actuating means selectively together or separately.

* * * * *